(12) United States Patent
Hanlon et al.

(10) Patent No.: US 7,640,743 B2
(45) Date of Patent: Jan. 5, 2010

(54) AIRCRAFT FLIGHT CONTROL USER INTERFACE LINKAGE SYSTEM

(75) Inventors: Casey Hanlon, Queen Creek, AZ (US); Dean R. Wilkens, Scottsdale, AZ (US); Pablo Bandera, Goodyear, AZ (US); Toren S. Davis, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 332 days.

(21) Appl. No.: 11/835,089

(22) Filed: Aug. 7, 2007

(65) Prior Publication Data

US 2009/0039205 A1 Feb. 12, 2009

(51) Int. Cl.
*F15B 7/00* (2006.01)
*B64C 13/12* (2006.01)

(52) U.S. Cl. ............... 60/571; 91/427; 244/226
(58) Field of Classification Search ............... 60/571, 60/570, 329; 91/427; 244/226, 229, 234
See application file for complete search history.

(56) References Cited

U.S. PATENT DOCUMENTS 6,572,055 B1 6/2003 Bernard
6,986,249 B2 * 1/2006 Bernard .................. 60/571

* cited by examiner

*Primary Examiner*—Thomas E Lazo
(74) *Attorney, Agent, or Firm*—Ingrassia Fisher & Lorenz, P.C.

(57) ABSTRACT

A user interface linkage system includes first and second user interfaces that are linked by a single hydraulic circuit. The system is configured to provide compensation for relatively slow changes in hydraulic fluid pressure due, for example, to temperature variations. The system is also configured to allow the user interfaces to be selectively unlinked from each other.

20 Claims, 5 Drawing Sheets

US 7,640,743 B2

AIRCRAFT FLIGHT CONTROL USER INTERFACE LINKAGE SYSTEM

TECHNICAL FIELD

The present invention relates to aircraft user interfaces and, more particularly, to a system that links aircraft flight control system user interfaces.

BACKGROUND

Aircraft typically include a plurality of flight control surfaces that, when controllably positioned, guide the movement of the aircraft from one destination to another. The number and type of flight control surfaces included in an aircraft may vary, but typically include both primary flight control surfaces and secondary flight control surfaces. The primary flight control surfaces are those that are used to control aircraft movement in the pitch, yaw, and roll axes, and the secondary flight control surfaces are those that are used to influence the lift or drag (or both) of the aircraft. Although some aircraft may include additional control surfaces, the primary flight control surfaces typically include a pair of elevators, a rudder, and a pair of ailerons, and the secondary flight control surfaces typically include a plurality of flaps, slats, and spoilers.

The positions of the aircraft flight control surfaces are typically controlled using a flight control surface actuation system. The flight control surface actuation system, in response to position commands that originate from either the flight crew or an aircraft autopilot, moves the aircraft flight control surfaces to the commanded positions. For example, during flight the pilot or co-pilot may position the primary flight control surfaces via one or more pilot or co-pilot user interfaces such as, for example, pilot and co-pilot yokes or control sticks, and pairs of pilot and co-pilot foot pedals. In particular, the pilot or co-pilot may control the position of the elevators, and thus aircraft pitch, by moving the pilot or co-pilot yoke or control stick in a relatively forward or rearward direction. The pilot or co-pilot may control the positions of the ailerons, and thus aircraft roll, by moving (or rotating) the pilot or co-pilot yoke or control stick in the left or right direction (or in the clockwise or counterclockwise direction). Moreover, the pilot or co-pilot may control the position of the rudder, and thus aircraft yaw, by translating a pair of right and left pilot or co-pilot rudder pedals using their right or left foot. It is further noted that in addition to being used to position the rudder, the pilot or co-pilot may also apply the brakes to the landing gear wheels by rotating a pilot or co-pilot brake pedal that may be integral with the rudder pedals.

Preferably, the pilot and co-pilot user interfaces described above are somehow linked so that when a pilot user interface is moved the corresponding co-pilot user interface moves at least substantially identically. For example, if the pilot moves the pilot control stick or pilot brake pedal, then the co-pilot control stick or co-pilot brake pedal will move at least substantially identically. There may be several benefits to linking the pilot and co-pilot user interfaces. One benefit is that the situational awareness of the flight crew is increased. That is, the pilot and co-pilot may each be able to closely monitor what the other is doing. Thus, in the highly unlikely event that one of them improperly positions their user interface, the other will be able to quickly recognize and correct this situation. Linking the pilot and co-pilot user interfaces can also be beneficial for pilot training.

Presently, pilot and co-pilot user interfaces are linked either mechanically, hydraulically, or electrically. The mechanical linkage systems and hydraulic linkage systems are typically rather complex and use significant numbers of components, which can undesirably increase overall system cost and weight, and concomitantly reduces system reliability. The electrical linkage systems, too, can be somewhat complex, which can also lead to increased system costs.

Hence, there is a need for a system that links user interfaces, such as those used in aircraft flight control systems, that is relatively less complex, relatively less costly, and relatively more reliable, than current systems. The present invention addresses at least this need.

BRIEF SUMMARY

In one embodiment, a user interface linkage system includes a first user interface, a second user interface, a first user interface fluid chamber, a second user interface fluid chamber, a temperature compensation fluid chamber, and a temperature compensation valve. The first and second user interfaces are each configured to rotate at least partially around a first axis. The first user interface fluid chamber is coupled to the first user interface and includes a first user interface hydraulic fluid volume that varies at least in response to rotation of the first user interface around the first axis. The second user interface fluid chamber is coupled to the second user interface and includes a second user interface hydraulic fluid volume that varies at least in response to rotation of the second user interface around the first axis. The second user interface hydraulic fluid volume is in fluid communication with the first user interface hydraulic fluid volume. The temperature compensation fluid chamber includes a temperature compensation hydraulic fluid volume that varies in response to temperature variations of hydraulic fluid disposed therein. The temperature compensation valve includes a first flow port and a second flow port. The temperature compensation valve first flow port is in fluid communication with the first and second user interface hydraulic fluid volumes. The temperature compensation valve second flow port is in fluid communication with the temperature compensation hydraulic fluid volume. The temperature compensation valve is movable between at least an open position, in which the temperature compensation valve first and second flow ports are in fluid communication with each other, and one or more closed positions, in which the temperature compensation valve first and second flow ports are not in fluid communication with each other.

In another exemplary embodiment, a user interface linkage system includes first and second user interfaces, first, second, third, and fourth user interface fluid chambers, a temperature compensation fluid chamber, and first and second temperature compensation valves. The first and second user interfaces are each configured to rotate at least partially around a first axis and a second axis that is perpendicular to the first axis. The first user interface fluid chamber is coupled to the first user interface and includes a first user interface hydraulic fluid volume that varies at least in response to rotation of the first user interface around the first axis. The second user interface fluid chamber is coupled to the second user interface and includes a second user interface hydraulic fluid volume that varies at least in response to rotation of the second user interface around the first axis. The second user interface hydraulic fluid volume is in fluid communication with the first user interface hydraulic fluid volume. The third user interface fluid chamber is coupled to the first user interface and includes a third user interface hydraulic fluid volume that varies at least in response to rotation of the first user interface around the second axis. The fourth user interface fluid chamber is coupled to the second user interface and includes a fourth user interface hydraulic fluid volume that varies at least in response to rotation of the second user interface around the second axis. The fourth user interface hydraulic fluid volume is in fluid communication with the third user interface hydraulic fluid volume. The temperature compensation fluid chamber includes a temperature compensation hydraulic fluid volume that varies in response to temperature variations of hydraulic fluid disposed therein. The first temperature compensation valve includes a first flow port and a second flow port. The first temperature compensation valve first flow port is in fluid communication with the first and second user interface hydraulic fluid volumes. The first temperature compensation valve second flow port is in fluid communication with the temperature compensation hydraulic fluid volume. The first temperature compensation valve is movable between at least an open position, in which the first temperature compensation valve first and second flow ports are in fluid communication with each other, and one or more closed positions, in which the first temperature compensation valve first and second flow ports are not in fluid communication with each other. The second temperature compensation valve includes a first flow port and a second flow port. The second temperature compensation valve first flow port is in fluid communication with the third and fourth user interface hydraulic fluid volumes. The second temperature compensation valve second flow port is in fluid communication with the temperature compensation hydraulic fluid volume. The second temperature compensation valve is movable between at least an open position, in which the second temperature compensation valve first and second flow ports are in fluid communication with each other, and one or more closed positions, in which the second temperature compensation valve first and second flow ports are not in fluid communication with each other.

Furthermore, other desirable features and characteristics of the preferred aircraft flight control system user interface linkage system will become apparent from the subsequent detailed description and the appended claims, taken in conjunction with the accompanying drawings.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description. In this regard, although much of the following description is directed to aircraft flight control user interfaces, it will be appreciated that the described system may also be implemented, for example, in aircraft flight simulators, unmanned autonomous vehicles (UAVs), for refueling booms, and/or nose wheel steering. Moreover, the invention may be implemented in both fixed-wing aircraft and rotary-wing aircraft.

Figure 1:
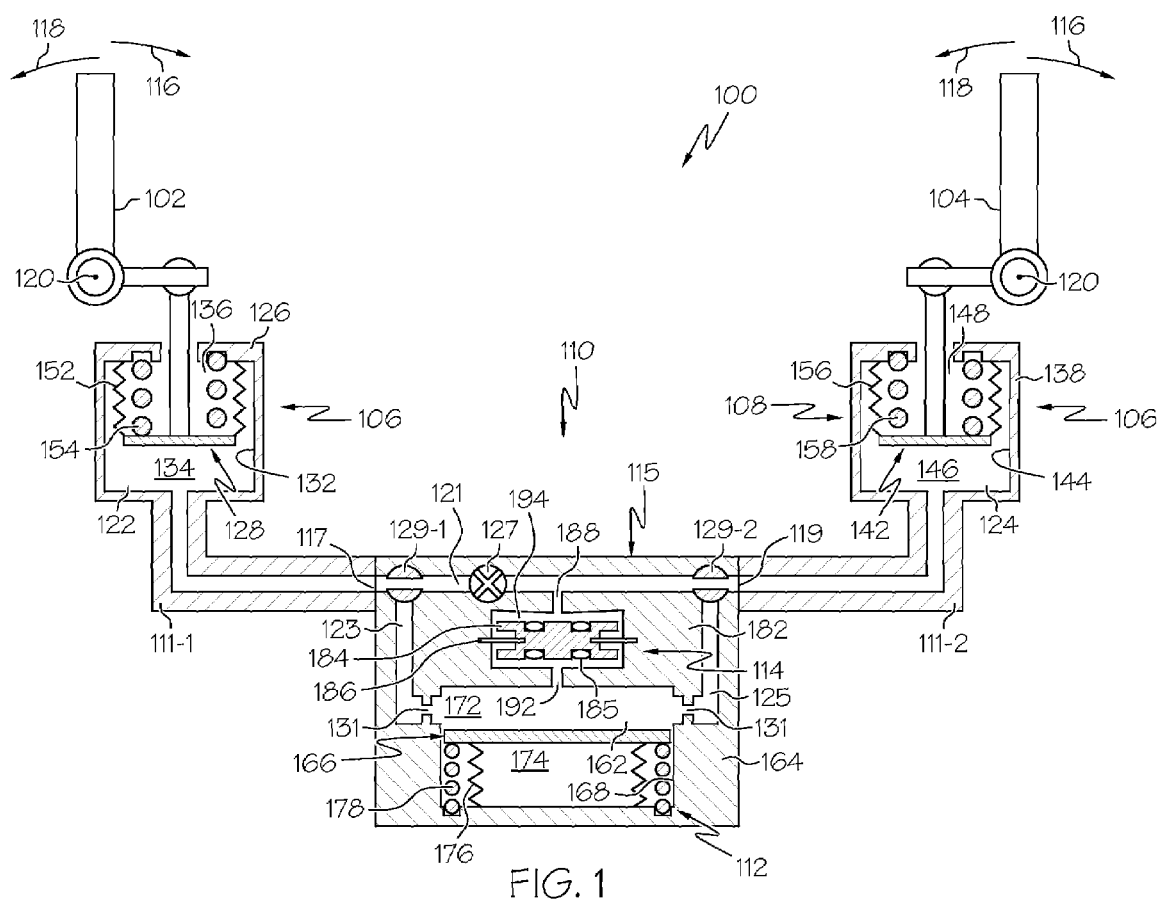
FIG. 1 is a schematic representation of an exemplary embodiment of a user interface linkage system in a first operational mode.

Turning now to FIG. 1, a schematic representation of an exemplary embodiment of a user interface linkage system 100 is depicted and includes a first user interface 102, a second user interface 104, a first user interface fluid chamber 106, a second user interface fluid chamber 108, a temperature compensation fluid chamber 112, and a temperature compensation valve 114. In the depicted embodiment, the first and second user interfaces 102, 104 are each configured to rotate at least partially, in both a first direction 116 and a second direction 118, around a first axis 120. More specifically, each user interface 102, 104 is responsive to an input force, which may be applied thereto from a user, to rotate in either the first or second direction 116, 118. Moreover, and as will be described in more detail further below, when an input force is supplied to the first or second user interface 102, 104 that causes it to rotate in either the first or second direction 116, 118, the system 100 is configured such that the second or first user interface 104, 102, respectively, will concomitantly be caused to rotate in the first or second direction 116, 118. To implement this latter functionality, the first and second user interfaces 102, 104 are hydraulically linked via a single hydraulic fluid circuit 110, an embodiment of which is described in more detail further below. As will also be described further below, the system 100 is also preferably configured to allow the user interfaces 102, 104 to be selectively operated in a non-linked manner.

Before proceeding further it is noted that in the embodiment depicted in FIG. 1, the user interfaces 102, 104 are configured to rotate only about the first axis 120; however, in other embodiments, one of which will be described further below, the user interfaces 102, 104 may be configured to rotate about two (or more) axes. It may thus be appreciated that the embodiment of FIG. 1 may be used to implement, for example, linked pilot and co-pilot brake pedals.

Returning once again to the description, it may be seen that the first user interface fluid chamber 106 is coupled to the first user interface 102, and the second user interface fluid chamber 108 is coupled to the second user interface 104. The first and second user interface fluid chambers 106, 108 each include a variable hydraulic fluid volume that are in fluid communication with each other via the hydraulic circuit 110. More specifically, the first user interface fluid chamber 106 includes a first user interface hydraulic fluid volume 122 that varies, among other things, in response to rotation of the first user interface 102 around the first axis 120. Similarly, the second user interface fluid chamber 108 includes a second user interface hydraulic fluid volume 124 that varies, among other things, in response to rotation of the second user interface 104 around the first axis 120. As will be described further below, the first and second user interface hydraulic fluid volumes 122, 124 will also vary, at least indirectly, in response to rotation of the second and first user interfaces 102, 104, respectively, around the first axis 120.

Although various configurations may be used to implement the first and second user interface fluid chambers 106, 108, in the depicted embodiment each includes a main body and a fluid displacement mechanism. More specifically, the first user interface fluid chamber 106 includes a first user interface fluid chamber main body 126 and a first user interface fluid displacement mechanism 128. The first user interface fluid chamber main body 126 has an inner surface 132 that defines a main fluid chamber 134. The first user interface fluid displacement mechanism 128 is coupled to the first user interface 102 and is movably disposed within the main fluid chamber 134. The first user interface fluid displacement mechanism 128 divides the main fluid chamber 134 into at least the first user interface hydraulic fluid volume 122 and a first user interface second fluid volume 136. The first user interface chamber main body 126 and first user interface fluid displacement mechanism 128 are further configured such that the first user interface second fluid volume 136 is fluidly isolated from the first user interface hydraulic fluid volume 122, and such that the volume of the first user interface second fluid volume 136 varies at least in response to rotation of the first user interface 102 around the first axis 120.

The second user interface fluid chamber 108 is substantially identical to the first user interface fluid chamber 106, and thus includes a second user interface fluid chamber main body 138 and a second user interface fluid displacement mechanism 142. The second user interface fluid chamber main body 138 has an inner surface 144 that defines a main fluid chamber 146. The second user interface fluid displacement mechanism 142 is coupled to the second user interface 104 and is movably disposed within the main fluid chamber 146. The second user interface fluid displacement mechanism 142 divides the main fluid chamber 146 into at least the second user interface hydraulic fluid volume 124 and a second user interface second fluid volume 148. The second user interface chamber main body 138 and second user interface fluid displacement mechanism 142 are further configured such that the second user interface second fluid volume 148 is fluidly isolated from the second user interface hydraulic fluid volume 124, and such that the volume of the second user interface second fluid volume 148 varies at least in response to rotation of the second user interface 104 around the first axis 120.

It will be appreciated that the first and second user interface fluid displacement mechanisms 128, 142 may be variously configured, but in the depicted embodiment each includes a flexible bellows and a spring. The first user interface fluid displacement mechanism flexible bellows 152 is coupled to the first user interface fluid chamber main body inner surface 132 and to the first user interface 102, and the first user interface displacement mechanism spring 154 is disposed between the first user interface fluid displacement mechanism flexible bellows 152 and the first user interface fluid chamber main body inner surface 132. Similarly, the second user interface fluid displacement mechanism flexible bellows 156 is coupled to the second user interface fluid chamber main body inner surface 144 and to the second user interface 104, and the second user interface displacement mechanism spring 158 is disposed between the second user interface fluid displacement mechanism flexible bellows 156 and the second user interface fluid chamber main body inner surface 144. It will be appreciated that in alternative embodiments, the first and second user interface fluid displacement mechanisms 128, 142 could be implemented with only a flexible bellows or with only a spring.

The temperature compensation fluid chamber 112 includes a temperature compensation hydraulic fluid volume 162 that varies in response to temperature variations of the hydraulic fluid in the hydraulic circuit 110. Although various configurations may be used to implement this functionality, in the depicted embodiment the temperature compensation fluid chamber 112 includes a temperature compensation fluid chamber main body 164 and a temperature compensation fluid displacement mechanism 166. The temperature compensation fluid chamber main body 164 includes an inner surface 168 that defines a main fluid chamber 172. The temperature compensation fluid displacement mechanism 166 is movably disposed within the main fluid chamber 172 and divides the main fluid chamber 172 into the temperature compensation hydraulic fluid volume 162 and a second temperature compensation volume 174. The temperature compensation hydraulic fluid volume 162 is in fluid communication with the temperature compensation valve 114 and, as will be described in more detail further below, may selectively be placed in fluid communication with the first and second user interface hydraulic fluid volumes 122, 124. The second temperature compensation volume 174 is fluidly isolated from the temperature compensation hydraulic fluid volume 162, and may have a fluid disposed therein, or may be open to the surrounding environment.

The temperature compensation fluid displacement mechanism 166 may be variously configured, but in the depicted embodiment it includes a flexible bellows 176 and a spring 178. The flexible bellows 176 is coupled to the main body inner surface and defines the second temperature compensation volume 174. The spring 178 is disposed between the flexible bellows 176 and the main volume inner surface 168. Preferably, the temperature compensation fluid displacement mechanism bellows 176 and spring 178 are configured to exhibit relatively low stiffness, and relatively high preload. Thus, the temperature compensation fluid displacement mechanism 166 functions similar to an accumulator. It will be appreciated that in alternative embodiments the temperature compensation fluid displacement mechanism 176 could be implemented using only the flexible bellows 176 or only the spring 178.

The temperature compensation valve 114, in at least the depicted embodiment, includes a main body 182, a valve element 184, and a spring 186. The main body 182 includes a first flow port 188, a second flow port 192, and a valve chamber 194 that fluidly communicates the first and second flow ports 188, 192. The temperature compensation valve main body first flow port 188 is in fluid communication with the first and second user interface hydraulic fluid volumes 122, 124. The temperature compensation valve main body second flow port 192 is in fluid communication with the temperature compensation hydraulic fluid volume 162.

The valve element 184 is disposed within the temperature compensation valve main body valve chamber 194, and is suspended therein via the spring 186, which is coupled between the temperature compensation valve main body 182 and the valve element 184. The spring 186 is preferably implemented using a low stiffness S-spring. It will be appreciated, however, that it may be implemented using various other types of resilient elements. The temperature compensation valve 114 is movable between at least an open position and a plurality of closed positions. In the open position, the temperature compensation valve first and second flow ports 188, 192 are in fluid communication with each other. Conversely, in the closed positions, the temperature compensation valve element 184 is either disposed adjacent the temperature compensation first flow port 188 or second flow port 192 and, via a pair of seals 185, seals the temperature compensation first 188 or second flow port 192 from the temperature compensation second 192 or first flow port 188, respectively. It is should be noted that in order for the first and second flow ports 188, 192 to be in fluid communication with each other when the temperature compensation valve 114 is in the open position, the spring 186 is configured to allow fluid flow through or by it.

As FIG. 1 depicts, the temperature compensation fluid chamber 112 and the temperature compensation valve 114 are preferably implemented as part of a manifold 115. It will be appreciated, however, that these portions of the system 100 could be implemented separately. Nonetheless, it is seen that the manifold 115 is coupled to the first and second user interface fluid chambers 106, 108 and not only defines the temperature compensation fluid chamber 112 and the temperature compensation valve main body 182, but additionally includes at least a first flow port 117, a second flow port 119, a main flow passage 121, a first passive flow passage 123, and a second passive flow passage 125. The manifold first flow port 117 is in fluid communication with the first user interface hydraulic fluid volume 122 via, for example, a first conduit 111-1, and the manifold second flow port 119 is in fluid communication with the second user interface hydraulic fluid volume 124 via a second conduit 111-2. A damping flow orifice 127 is disposed in the main flow passage 121 between the manifold first and second flow passages 117, 119. It will be appreciated that the damping flow orifice 127 may be implemented as either a fixed flow orifice or a variable flow orifice. If the damping flow orifice 127 is a variable orifice, it is preferably implemented using a valve that is movable between a closed position and a plurality of open positions. It will be appreciated that if the damping control orifice 127 is implemented using a valve, the valve position may be dynamically controlled.

In addition to the damping orifice, a pair of isolation valves 129-1, 129-2 is preferably disposed in the main flow passage 121. Preferably, a first isolation valve 129-1 is disposed adjacent the manifold first flow port 117, and a second isolation valve 129-2 is disposed adjacent the manifold second flow port 119. The isolation valves 129-1, 129-2 are preferably movable between first and second positions. In the first position, which is the normal position of the isolation valves 129-1, 129-2 and the position depicted in FIG. 1, the manifold first and second flow ports 117, 119, and thus the first and second user interface hydraulic fluid volumes 122, 124, are in fluid communication with the temperature compensation valve first flow port 188. In the second position, which is the position of the isolation valves 129-1, 129-2 depicted in FIG. 2, the manifold first and second flow ports 117, 119, and thus the first and second user interface hydraulic fluid volumes 122, 124, are no longer in fluid communication with the temperature compensation valve first flow port 188. Instead, the first and second user interface hydraulic fluid volumes 122, 124 are in fluid communication with the temperature compensation hydraulic fluid volume 162 via the first and second passive flow passages 123, 125. As FIGS. 1 and 2 additionally depict, the first and second passive flow passages 123, 125 may also each include a damping orifice 131, if needed or desired.

As was just noted, the normal position of the isolation valves 129-1, 129-2 is the first position, or the position depicted in FIG. 1. In this position, and as will be described in more detail further below, the first and second user interfaces 102, 104 are hydraulically linked, and the temperature compensation valve element 184 is moved between its first and second positions in response to fluid pressure variations in the hydraulic circuit 110 that result from movement of the first and second user interfaces 102, 104. If, however, it is desired that the first and second user interfaces no longer be hydraulically linked, then the isolation valves 129-1, 129-2 are preferably moved to the second position. In this position, although the first and second user interface hydraulic fluid volumes 122, 124 are in fluid communication with each other via the temperature compensation hydraulic fluid volume 162, the configuration of the temperature compensation fluid displacement mechanism 166 (e.g., low stiffness, high preload) effectively causes the first and second user interfaces 102, 104 to no longer be hydraulically linked. In other words, if the isolation valves 129-1, 129-2 are in the second position, rotation of the first user interface 102 will not cause a concomitant rotation of the second user interface 104, and vice-versa.

Figure 3:
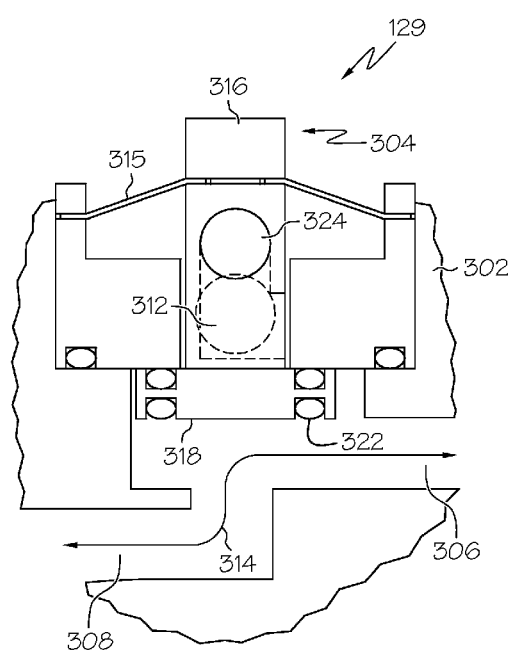
FIGS. 3 and 4 are cross section views of isolation valves that may be used to implement the system depicted in FIGS. 1 and 2.
Figure 4:
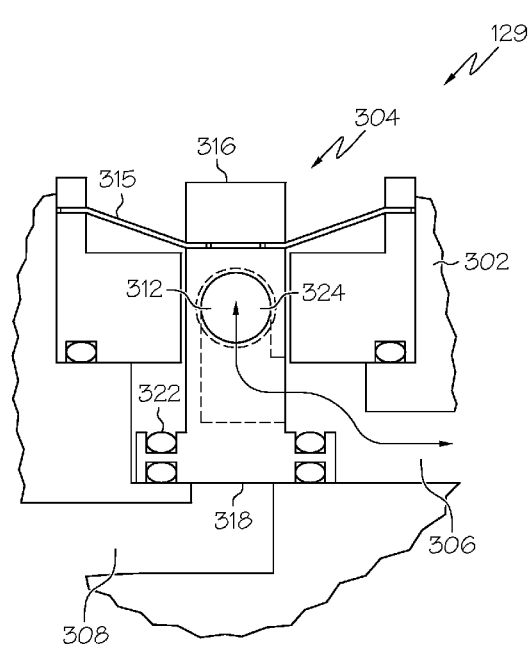

Before continuing with a slightly more detailed description of the operation of the system, it is noted that the isolation valves 129-1 could be implemented using any one of numerous types of two position valves. However, one particular preferred implementation is depicted is FIGS. 3 and 4, and with reference thereto will now be described. The isolation valve 129, which is depicted in the first position in FIG. 3 and in the second position in FIG. 4, includes a main body 302 and a valve element 304. The main body 302, which may be formed as part of the manifold 115, includes a first flow port 306, a second flow port 308, a third flow port 312, and a flow passage 314. The first flow port 306 is in fluid communication with one of the conduits 111-1, 111-2, the second flow port 308 is in fluid communication with the manifold main flow passage 121, and the third flow port 312 is in fluid communication with the temperature compensation hydraulic fluid volume 162, via one of the passive flow passages 123, 125.

The valve element 304 is disposed within the isolation valve main body 302, and includes an interface element 316 and an isolation element 318. The interface element 316 extends through the main body 302 and is used to move the isolation valve 129 between the first and second positions. In the depicted embodiment the interface element 316 is configured as a manually-operated element. It will be appreciated, however, that in alternative embodiments an actuator, such as a hydraulic, pneumatic, electric, or electromechanical actuator, could be coupled to the interface element 316 to move the isolation valve 129 between the first and second positions. As FIGS. 3 and 4 also depict, a resilient bias element 315, such as a diaphragm or bellows, may be coupled between the interface element 316 and the main body 302 to resiliently bias the interface element 316 toward the first and second positions and to seal the flow passage 314 from the surrounding environment.

The isolation element 318 is coupled to the interface element 316 and moves therewith between the first and second positions. The isolation element 318 includes a plurality of seals 322 and is used to fluidly communicate or isolate the first flow port 306 from the second flow port 308 and the third flow port 312. More specifically, when the isolation valve 129 is in the first position (FIG. 3), the first flow port 306 and second flow port 308 are in fluid communication with each other, and the isolation element 318 fluidly isolates the first flow port 306 from the third flow port 312. Conversely, when the isolation valve 129 is in the second position (FIG. 4), the first flow port 306 and third flow port 312 are in fluid communication with each other, and the isolation element 318 fluidly isolates the first flow port 306 from the second flow port 308. It is seen that in the second position the first flow port 306 and third flow port 312 are in fluid communication with each other via a flow port 324 that is formed in, and extends through, the interface element 316.

Returning once again to FIGS. 1 and 2, having described the overall operation of the user interface linkage system 100 generally, and an exemplary embodiment thereof in detail, a more detailed description of the operation of the described embodiment will now be provided. In doing so, it is assumed that the isolation valves 129-1, 129-2 are each initially in the first position, which is the position depicted in FIG. 1. In this position, which is the normal position for the isolation valves 129-1, 129-2, the user interfaces 102, 104 are hydraulically linked, and thus the system 100 is configured in what is referred to herein as the active mode. Thereafter, operation of the user interface linkage system 100 will be described with the valves 129-1, 129-2 in the second position, which is the position depicted in FIG. 2. In this position the user interfaces 102, 104 are no longer hydraulically linked, and thus the system 100 is configured in what is referred to herein as the passive mode.

Turning now to FIG. 1, it may be seen that if the first user interface 102 is rotated in the first direction 116, the first user interface fluid displacement mechanism 128 will expand. As a result, the first user interface hydraulic fluid volume 122 will decrease, and hydraulic fluid will be displaced from the first user interface fluid chamber 106 and directed into the second user interface fluid chamber 108, via the hydraulic circuit 110. The fluid directed into the second user interface hydraulic fluid volume 124 causes the second user interface fluid displacement mechanism 142 to contract. As a result, the second user interface hydraulic fluid volume 124 increases and the second user interface 104 is concomitantly rotated in the first direction 116.

Conversely, if the first user interface 102 is rotated in the second direction 118, the first user interface fluid displacement mechanism 128 will contract. As a result, the first user interface hydraulic fluid volume 122 will increase, and hydraulic fluid will be drawn into the first user interface fluid chamber 106 and displaced from the second user interface fluid chamber 108, via the hydraulic circuit 110. The fluid displacement from the second user interface fluid chamber 108 causes the second user interface fluid displacement mechanism 142 to expand. As a result, the second user interface hydraulic fluid volume 124 decreases and the second user interface 104 is concomitantly rotated in the second direction. Before continuing, it should be noted that rotation of the second user interface 104 in either the first or second direction 116, 118 would similarly effect movement of the first user interface 102. This is readily apparent to the skilled artisan, and thus this operation is not described in detail.

It is further noted that when hydraulic fluid is displaced from the first or second user interface fluid chambers 106, 108, the pressure of the hydraulic fluid in the hydraulic circuit 110 will initially increase relatively rapidly. This increased hydraulic fluid pressure will move the temperature compensation valve 114 to its second position. More specifically, the increased fluid pressure will act on the temperature compensation valve element 184, moving it to the second position and isolating the temperature compensation valve first flow port 188 from the second flow port 192. As a result, the manifold main flow passage 121 is fluidly isolated from the temperature compensation hydraulic fluid volume 162. Thus, the temperature compensation hydraulic fluid volume 162 will not affect the hydraulic linking of the user interfaces 102, 104, since the temperature compensation hydraulic fluid volume 162 is included to primarily provide temperature compensation, which will now be described.

The user interface linking system 100 may be exposed to varying temperatures, which can affect system operation, due to the impact that varying environmental temperatures and pressures may have on the hydraulic fluid. This, of course, is the main purpose for including the temperature compensation hydraulic fluid chamber 112 and the temperature compensation valve 114. In particular, temperature variations may cause, for example, variations in hydraulic fluid pressure in a non-compensated system. Moreover, pressure variations due, for example, to variations in altitude, may cause variations in hydraulic fluid pressure in a non-compensated system. In the depicted system, however, such variations are compensated for. In particular, if the temperature of the system 100 increases and hydraulic fluid pressure thus increases, then the hydraulic fluid in the hydraulic circuit 110 will expand. The relatively slow hydraulic fluid expansion is compensated for by allowing fluid flow past the temperature compensation valve 114, into the temperature compensation hydraulic fluid volume 162, and against the temperature compensation fluid displacement mechanism 166. Conversely, if the temperature of the system 100 decreases and hydraulic fluid pressure thus decreases, then the hydraulic fluid in the hydraulic circuit 110 will contract. The relatively slow hydraulic fluid contraction is compensated for by allowing fluid to flow from the temperature compensation hydraulic fluid volume 162, via the influence of the temperature compensation fluid displacement mechanism 166, past the temperature compensation valve 114, and into manifold main flow passage 121.

If it is needed or desired to operate the system 100 in the passive mode, then, as noted above and as depicted in FIG. 2, the isolation valves 129-1, 129-2 are moved to the second position. In the passive mode, as in the active mode, if the first user interface 102 is rotated in the first direction 116, the first user interface fluid displacement mechanism 128 will expand. As a result, the first user interface hydraulic fluid volume 122 will decrease, and hydraulic fluid will be displaced from the first user interface fluid chamber 106. However, unlike the active mode, the fluid displaced from the first user interface fluid chamber 106 is directed into the temperature compensation hydraulic fluid volume 162. The fluid directed into the temperature compensation hydraulic fluid volume 162 causes the temperature compensation fluid displacement mechanism 166 to contract due, as described above, to its relatively low stiffness. As a result, the second user interface 104 is not impacted by the rotation of the first user interface 102, and does not concomitantly rotate. It may thus be appreciated that in the passive mode the first and second user interfaces 102, 104 may be moved independently of each other.

Figure 2:
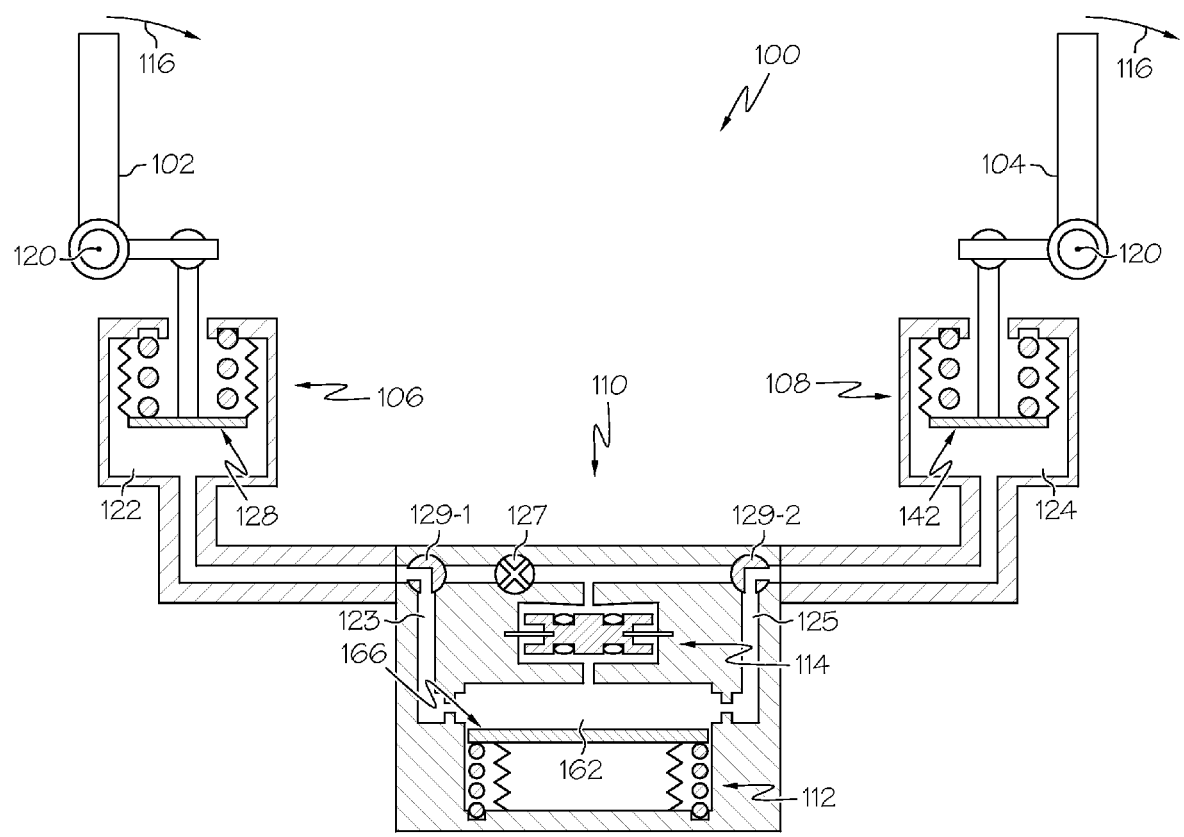
FIG. 2 is a schematic representation of the exemplary user interface linkage system of FIG. 1, but in a second operational mode.
Figure 5:
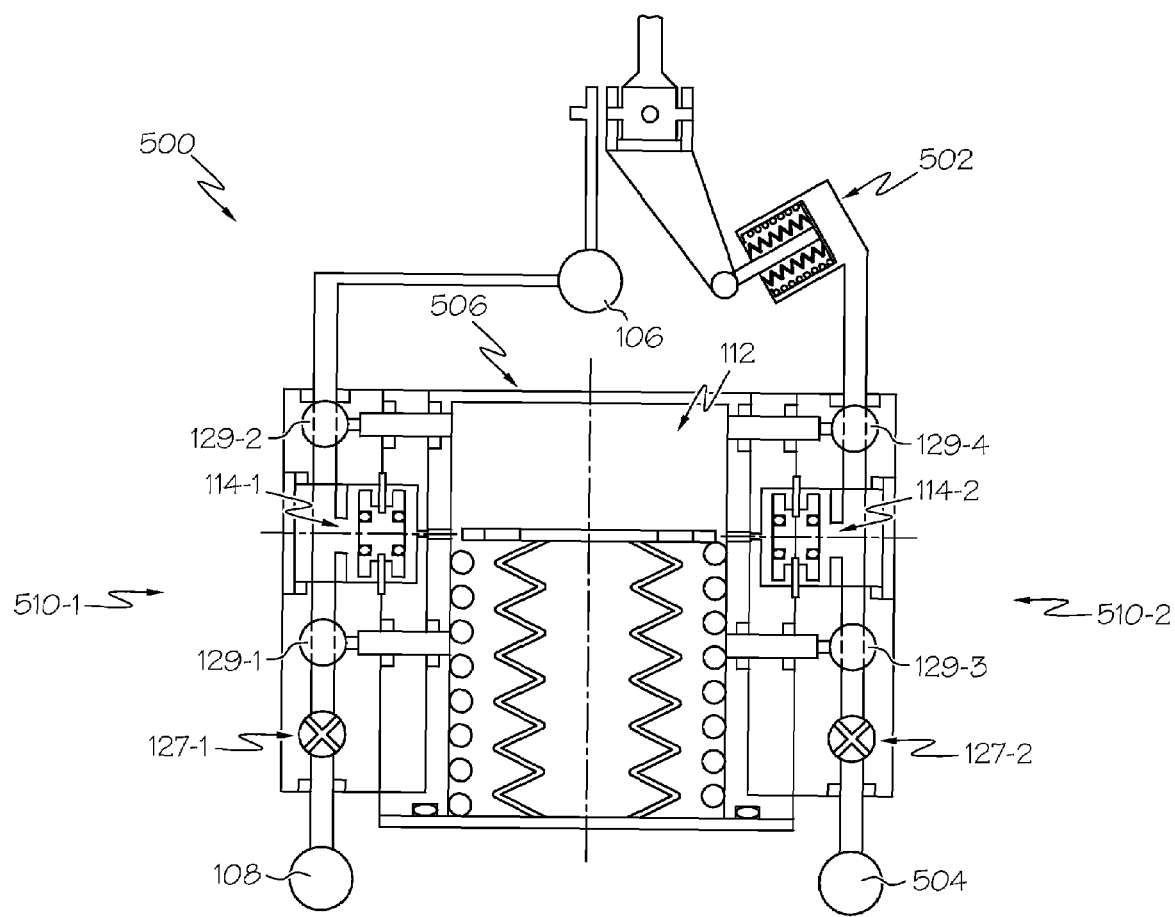
FIG. 5 is a schematic representation of an exemplary embodiment of a multi-axis user interface linkage system.

The system 100 depicted in FIGS. 1 and 2 and described above is configured for user interfaces 102, 104 that are configured to rotate about a single axis 120. However, as was previously noted, the system 100 may also be configured for user interfaces 102, 104 that rotate about two (or more) axes, such as flight control sticks, or the like. For these types of user interfaces, the system preferably includes a plurality of hydraulic circuits, one for each axis of rotation. Thus, for a multi-axis system 500 that includes two user interfaces 102, 104 (only one depicted in FIG. 5) that are configured to rotate about two perpendicular axes, which is the system depicted in schematic form in FIG. 5, two fluid circuits 510-1, 510-2 are included. As FIG. 5 depicts, in addition to the first and second user interface fluid chambers 106, 108, the multi-axis system 500 includes a third user interface fluid chamber 502 coupled to the first user interface 102, and a fourth user interface fluid chamber 504 coupled to the second user interface 104. The multi-axis system 500 further includes two isolation valves 129 per fluid circuit (for a total of four isolation valves 129-1, 129-2, 129-3, 129-4), one temperature compensation valves 114 per fluid circuit (for a total of two temperature compensation valves 114-1, 114-2), and one damping control orifice 127 per fluid circuit (for a total of two damping control orifices 127-1, 127-2). Preferably, the multi-axis system 500 is configured with only a single temperature compensation fluid chamber 112.

Figure 6:
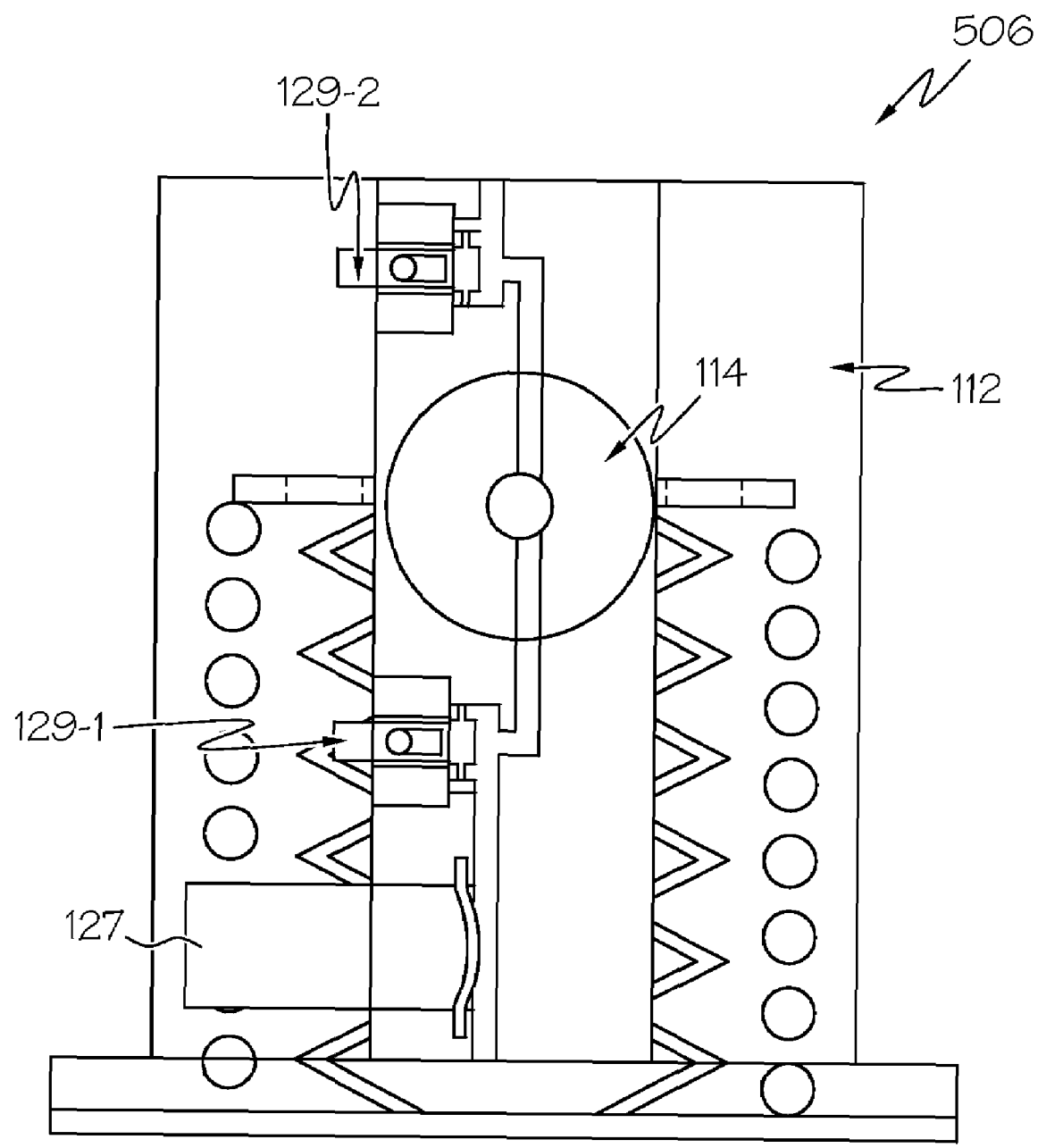
FIG. 6 is a cross section view of a portion of the system depicted in FIG. 5.

As FIGS. 5 and 6 further depict, the temperature compensation fluid chamber 112, the temperature compensation valves 114, the isolation valves 129, and the damping control orifices 127, are preferably implemented as part of a single manifold 506. Moreover, as shown most clearly in FIG. 6, the damping control orifices 127, at least in the depicted embodiment, are implemented as valves.

The operation of the multi-axis system 500 for user interface movement 102, 104 in each rotational axis is substantially identical to the single axis system 100 described above. As such, a detailed description of its operation is not provided.

The user interface linkage systems 100, 500 described herein link user interfaces 102, 104, such as those used in aircraft flight control systems. The systems 100, 500 are relatively less complex, relatively less costly, and relatively more reliable, than current systems.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A user interface linkage system, comprising:
a first user interface configured to rotate at least partially around a first axis;
a second user interface configured to rotate at least partially around the first axis;
a first user interface fluid chamber coupled to the first user interface, the first user interface fluid chamber including a first user interface hydraulic fluid volume that varies at least in response to rotation of the first user interface around the first axis;
a second user interface fluid chamber coupled to the second user interface, the second user interface fluid chamber including a second user interface hydraulic fluid volume that varies at least in response to rotation of the second user interface around the first axis, the second user interface hydraulic fluid volume in fluid communication with the first user interface hydraulic fluid volume;
a temperature compensation fluid chamber, the temperature compensation fluid chamber including a temperature compensation hydraulic fluid volume that varies in response to temperature variations of hydraulic fluid disposed therein; and
a temperature compensation valve including a first flow port and a second flow port, the temperature compensation valve first flow port in fluid communication with the first and second user interface hydraulic fluid volumes, the temperature compensation valve second flow port in fluid communication with the temperature compensation hydraulic fluid volume, the temperature compensation valve movable between at least an open position, in which the temperature compensation valve first and second flow ports are in fluid communication with each other, and one or more closed positions, in which the temperature compensation valve first and second flow ports are not in fluid communication with each other.

2. The system of claim 1, further comprising:
a damping control orifice disposed between, and in fluid communication with, the first and second user interface hydraulic fluid volume.

3. The system of claim 2, wherein the damping control orifice comprises a damping control valve movable between a closed position and a plurality of open positions.

4. The system of claim 1, further comprising:
a first isolation valve disposed between the first user interface fluid hydraulic fluid volume and the temperature compensation valve first flow port, the first isolation valve moveable between a first position, in which the first user interface hydraulic fluid volume is in fluid communication with the temperature compensation valve first flow port, and a second position, in which the first user interface hydraulic fluid volume is not in fluid communication with the temperature compensation valve first flow port; and
a second isolation valve disposed between the second user interface hydraulic fluid volume and the temperature compensation valve first flow port, the second isolation valve moveable between a first position, in which the second user interface hydraulic fluid volume is in fluid communication with the temperature compensation valve first flow port, and a second position, in which the second user interface variable hydraulic fluid volume is not in fluid communication with the temperature compensation valve first flow port.

5. The system of claim 4, wherein:
the first user interface hydraulic fluid volume is in fluid communication with the temperature compensation hydraulic fluid volume when the first isolation valve is in the second position; and
the second user interface variable volume fluid chamber is in fluid communication with the temperature compensation hydraulic fluid volume when the second isolation valve is in the second position.

6. The system of claim 4, wherein the first and second isolation valves each comprise:
a main body having a first flow port, a second flow port, a third flow port, and a flow passage formed therein;
a valve element disposed within the main body flow passage and movable between the first position, in which the main body first flow port is in fluid communication with the main body second flow port and not in fluid communication with the main body third flow port, and the second position, in which the main body first flow port is in fluid communication with the main body third flow port and not in fluid communication with the main body second flow port.

7. The system of claim 1, wherein the first user interface fluid chamber comprises:
a first user interface fluid chamber main body having an inner surface that defines a main fluid chamber;
a first user interface fluid displacement mechanism coupled to the first user interface and movably disposed within the main fluid chamber, the first user interface fluid displacement mechanism dividing the main fluid chamber into at least the first user interface hydraulic fluid volume and a first user interface second fluid volume, the first user interface second fluid volume fluidly isolated from the first user interface hydraulic fluid volume and having a volume that varies at least in response to rotation of the first user interface around the first axis.

8. The system of claim 7, wherein the first user interface fluid displacement mechanism comprises:
a flexible bellows coupled to the main body inner surface and to the first user interface; and
a spring disposed between the flexible bellows and the main body inner surface.

9. The system of claim 1, wherein the second user interface fluid chamber comprises:
a second user interface fluid chamber main body having an inner surface that defines a main fluid chamber;
a second user interface fluid displacement mechanism coupled to the second user interface and movably disposed within the main fluid chamber, the second user interface fluid displacement mechanism dividing the main fluid chamber into the second user interface hydraulic fluid volume and a second user interface second fluid volume, the second user interface second fluid volume fluidly isolated from the second user interface hydraulic fluid volume and having a volume that varies at least in response to rotation of the second user interface around the first axis.

10. The system of claim 9, wherein the second user interface fluid displacement mechanism comprises:
a flexible bellows coupled to the main body inner surface and to the first user interface; and
a spring disposed between the flexible bellows and the main body inner surface.

11. The system of claim 1, wherein the temperature compensation fluid chamber comprises:
a temperature compensation fluid chamber main body having an inner surface that defines a main fluid chamber;
a temperature compensation fluid displacement mechanism movably disposed within the main fluid chamber, the temperature compensation fluid displacement mechanism dividing the main fluid chamber into the temperature compensation hydraulic fluid volume and a second temperature compensation volume, the second temperature compensation volume fluidly isolated from the temperature compensation hydraulic fluid volume and having a compressible fluid disposed therein.

12. The system of claim 11, wherein the temperature compensation fluid displacement mechanism comprises:
a flexible bellows coupled to the main body inner surface; and
a spring disposed between the flexible bellows and the main volume inner surface.

13. The system of claim 1, wherein the temperature compensation valve comprises:
a main body that defines the first flow port, the second flow port, and a valve chamber that fluidly communicates the first and second flow ports;
a valve element disposed within the valve chamber; and
a spring coupled between the main body and the valve element.

14. The system of claim 1, further comprising:
a manifold coupled to the first and second user interface fluid chambers and including at least first and second flow ports, the manifold first flow port in fluid communication with the first user interface hydraulic fluid volume, the temperature compensation valve first flow port, and the temperature compensation hydraulic fluid volume, the manifold second flow port in fluid communication with the second user interface hydraulic fluid volume, the temperature compensation valve first flow port, and the temperature compensation hydraulic fluid volume.

15. The system of claim 14, further comprising:
a first damping control orifice disposed between, and in fluid communication with, the first user interface hydraulic fluid volume and the temperature compensation hydraulic fluid volume; and
a second damping control orifice disposed between, and in fluid communication with, the second user interface hydraulic fluid volume and the temperature compensation hydraulic fluid volume.

16. The system of claim 1, wherein:
rotation of the first user interface in a first direction causes the first user interface hydraulic fluid volume to decrease and discharge fluid therefrom and into the second user interface hydraulic fluid volume, whereby the second user interface hydraulic fluid volume increases and rotates the second user interface in the first direction; and
rotation of the first user interface in a second direction causes the first user interface hydraulic fluid volume to increase and draw fluid therein from and the second user interface hydraulic fluid volume, whereby the second user interface hydraulic fluid volume decreases and rotates the second user interface in the second direction.

17. The system of claim 1, wherein:
rotation of the second user interface in the first direction causes the second user interface hydraulic fluid volume to increase and draw fluid therein from and the first user interface hydraulic fluid volume, whereby the first user interface hydraulic fluid volume decreases and rotates the first user interface in the first direction; and
rotation of the second user interface in the second direction causes the second user interface hydraulic fluid volume to decrease and discharge fluid therefrom and into the first user interface hydraulic fluid volume, whereby the first user interface hydraulic fluid volume decreases and rotates the first user interface in the second direction.

18. The system of claim 1, wherein the first and second user interfaces are each further configured to rotate at least partially around a second axis that is perpendicular to the first axis, and wherein the system further comprises:
a third user interface fluid chamber coupled to the first user interface, the third user interface fluid chamber including a third user interface hydraulic fluid volume that varies at least in response to rotation of the first user interface around the second axis; and
a fourth user interface fluid chamber coupled to the second user interface, the fourth user interface fluid chamber including a fourth user interface hydraulic fluid volume that varies at least in response to rotation of the second user interface around the second axis, the fourth user interface hydraulic fluid volume in fluid communication with the third user interface hydraulic fluid volume.

19. A user interface linkage system, comprising:
a first user interface configured to rotate at least partially around a first axis and a second axis, the second axis perpendicular to the first axis;
a second user interface configured to rotate at least partially around the first and second axes;
a first user interface fluid chamber coupled to the first user interface, the first user interface fluid chamber including a first user interface hydraulic fluid volume that varies at least in response to rotation of the first user interface around the first axis;
a second user interface fluid chamber coupled to the second user interface, the second user interface fluid chamber including a second user interface hydraulic fluid volume that varies at least in response to rotation of the second user interface around the first axis, the second user interface hydraulic fluid volume in fluid communication with the first user interface hydraulic fluid volume;
a third user interface fluid chamber coupled to the first user interface, the third user interface fluid chamber including a third user interface hydraulic fluid volume that varies at least in response to rotation of the first user interface around the second axis;

a fourth user interface fluid chamber coupled to the second user interface, the fourth user interface fluid chamber including a fourth user interface hydraulic fluid volume that varies at least in response to rotation of the second user interface around the second axis, the fourth user interface hydraulic fluid volume in fluid communication with the third user interface hydraulic fluid volume a temperature compensation fluid chamber, the temperature compensation fluid chamber including a temperature compensation hydraulic fluid volume that varies in response to temperature variations of hydraulic fluid disposed therein;

a first temperature compensation valve including a first flow port and a second flow port, the first temperature compensation valve first flow port in fluid communication with the first and second user interface hydraulic fluid volumes, the first temperature compensation valve second flow port in fluid communication with the temperature compensation hydraulic fluid volume, the first temperature compensation valve movable between at least an open position, in which the first temperature compensation valve first and second flow ports are in fluid communication with each other, and one or more closed positions, in which the first temperature compensation valve first and second flow ports are not in fluid communication with each other; and a second temperature compensation valve including a first flow port and a second flow port, the second temperature compensation valve first flow port in fluid communication with the third and fourth user interface hydraulic fluid volumes, the second temperature compensation valve second flow port in fluid communication with the temperature compensation hydraulic fluid volume, the second temperature compensation valve movable between at least a closed position, in which the second temperature compensation valve first and second flow ports are in fluid communication with each other, and one or more closed positions, in which the second temperature compensation valve first and second flow ports are not in fluid communication with each other.

20. The system of claim 19, wherein:

rotation of the first user interface in a first direction about the first axis causes the first user interface hydraulic fluid volume to decrease and discharge fluid therefrom and into the second user interface hydraulic fluid volume, whereby the second user interface hydraulic fluid volume increases and rotates the second user interface in the first direction about the first axis;

rotation of the first user interface in a second direction about the first axis causes the first user interface hydraulic fluid volume to increase and draw fluid therein from and the second user interface hydraulic fluid volume, whereby the second user interface hydraulic fluid volume decreases and rotates the second user interface in the second direction about the first axis;

rotation of the first user interface in a first direction about the second axis causes the third user interface hydraulic fluid volume to decrease and discharge fluid therefrom and into the fourth user interface hydraulic fluid volume, whereby the fourth user interface hydraulic fluid volume increases and rotates the second user interface in the first direction about the second axis; and rotation of the first user interface in a second direction about the third axis causes the third user interface hydraulic fluid volume to increase and draw fluid therein from the fourth user interface hydraulic fluid volume, whereby the fourth user interface hydraulic fluid volume decreases and rotates the second user interface to rotate in the second direction about the second axis;

rotation of the second user interface in the first direction about the first axis causes the second user interface hydraulic fluid volume to increase and draw fluid therein from and the first user interface hydraulic fluid volume, whereby the first user interface hydraulic fluid volume decreases and rotates the first user interface in the first direction about the first axis;

rotation of the second user interface in the second direction about the first axis causes the second user interface hydraulic fluid volume to decrease and discharge fluid therefrom and into the first user interface hydraulic fluid volume, whereby the first user interface hydraulic fluid volume decreases and rotates the first user interface in the second direction;

rotation of the second user interface in a first direction about the second axis causes the fourth user interface hydraulic fluid volume to decrease and discharge fluid therefrom and into the third user interface hydraulic fluid volume, whereby the third user interface hydraulic fluid volume increases and rotates the first user interface in the first direction about the second axis; and rotation of the first user interface in a second direction about the third axis causes the fourth user interface hydraulic fluid volume to increase and draw fluid therein from the third user interface hydraulic fluid volume, whereby the third user interface hydraulic fluid volume decreases and rotates the first user interface in the second direction about the second axis.

* * * * *